United States Patent
Liu

(10) Patent No.: US 10,381,030 B1
(45) Date of Patent: Aug. 13, 2019

(54) DATA STORAGE DEVICE CONTROLLING DUAL STAGE ACTUATOR WITH TRIPLE STAGE SERVO LOOP

(71) Applicant: Western Digital Technologies, Inc., San Jose, CA (US)

(72) Inventor: Yanning Liu, San jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/034,697

(22) Filed: Jul. 13, 2018

(51) Int. Cl.
G11B 5/54 (2006.01)
G11B 5/55 (2006.01)
G11B 5/596 (2006.01)
G11B 5/48 (2006.01)

(52) U.S. Cl.
CPC .......... *G11B 5/59627* (2013.01); *G11B 5/483* (2015.09)

(58) Field of Classification Search
CPC ....... G11B 15/00; G11B 19/00; G11B 15/087; G11B 15/46; G11B 15/54; G11B 5/56; G11B 5/58; G11B 5/5965; G11B 5/5552; G11B 5/556; G11B 5/55; G11B 5/5521; G11B 5/5547; G11B 5/5556
USPC ..... 360/72.2, 73.11, 73.12, 75, 77.01, 77.07, 360/77.08, 78.05, 78.13
See application file for complete search history.

(56) References Cited

U.S. PATENT DOCUMENTS 6,710,966 B1 * 3/2004 Codilian ............ G11B 5/59627
360/77.02
2009/0034128 A1 2/2009 Sharma et al.

OTHER PUBLICATIONS

Jinwen Pan, Omid Bagherieh, Behrooz Shahsavari, Roberto Horowitz, "Triple-Stage Track-Following Servo Design for Hard Disk Drives," Proceedings of the ASME 2016 Dynamic Systems and control Conference, Oct. 12-14, 2016, Minneapolis, Minnesota, USA.

* cited by examiner

*Primary Examiner* — Nabil Z Hindi

(57) ABSTRACT

A data storage device is disclosed comprising a voice coil motor (VCM) and a secondary actuator configured to actuate a head over a disk. A position error signal (PES) is generated based on servo data recorded on the disk, and a first control signal is generated based on the PES. The PES is adjusted based on the first control signal to generate a first adjusted PES, and a second control signal is generated based on the first adjusted PES. A secondary actuator control signal is generated based on the first control signal and the second control signal, wherein the secondary actuator control signal is applied to the secondary actuator. The first adjusted PES is adjusted based on the second control signal to generate a second adjusted PES, and a VCM control signal is generated based on the second adjusted PES, wherein the VCM control signal is applied to the VCM.

11 Claims, 4 Drawing Sheets

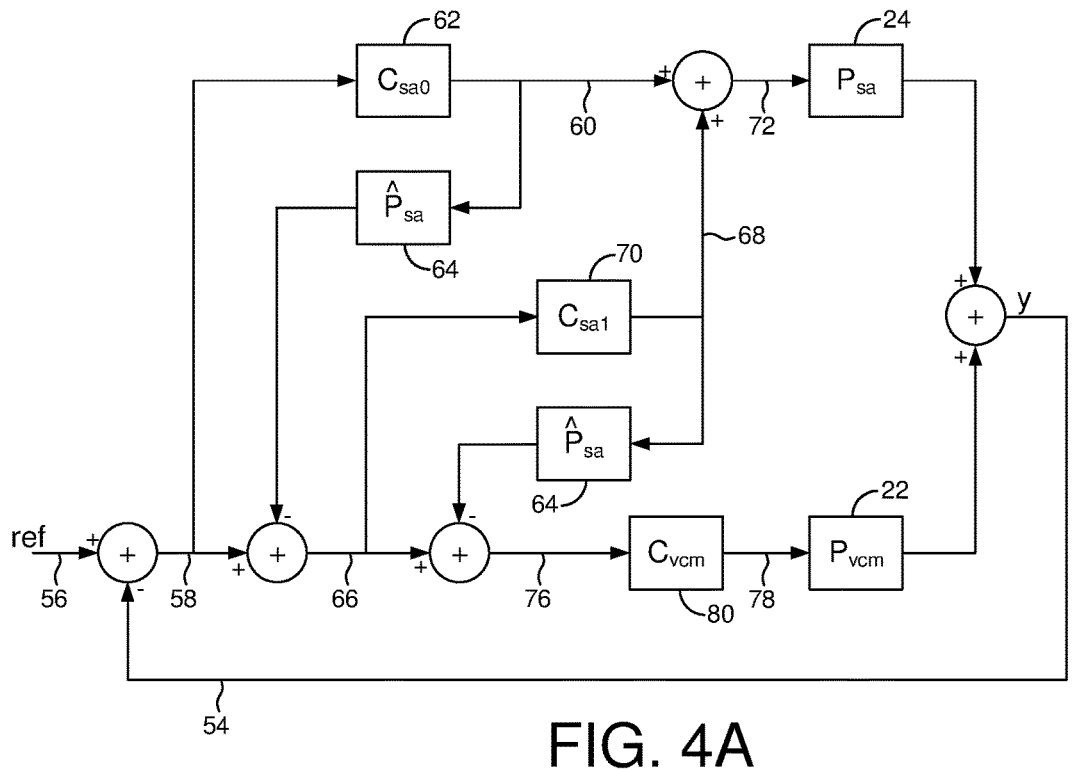
FIG. 4A
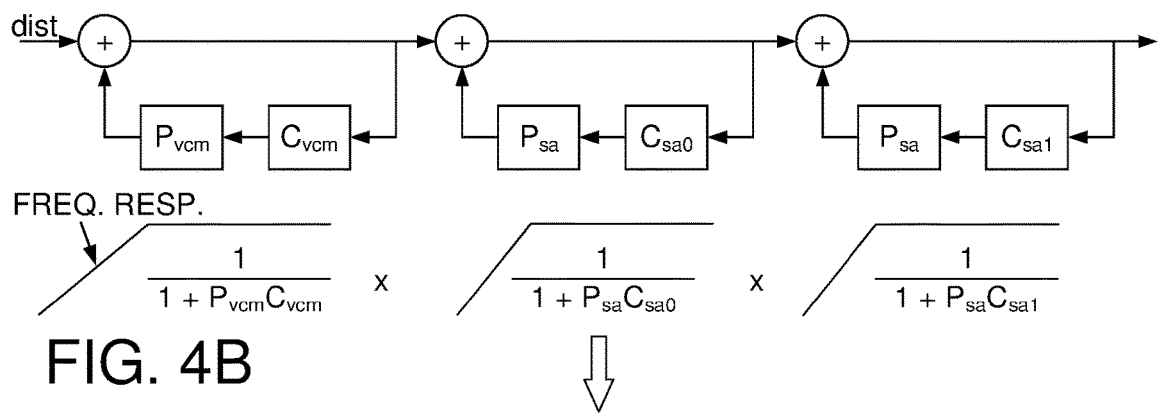
FIG. 4B
FIG. 4C

DATA STORAGE DEVICE CONTROLLING DUAL STAGE ACTUATOR WITH TRIPLE STAGE SERVO LOOP

BACKGROUND

Data storage devices such as the disk drive shown in FIG. 1 comprise a disk 2 and a head 4 actuated radially over the disk 2. The disk 2 comprises a plurality of radially spaced, concentric tracks 6 for recording user data sectors and servo sectors 8₁-8N. The servo sectors 8₁-8N comprise head positioning information (e.g., a track address and servo bursts) read by the head 4 and processed by a servo control system in control circuitry 10 to seek the head 4 from track to track as well as track the centerline of a data track during access operations (write/read operations).

As the radial density of the data tracks increases to achieve higher capacity, disk drives may employ multiple actuators for actuating the head 4 over the disk 2. For example, the prior art disk drive shown in FIG. 1 utilizes three actuators including a primary actuator in the form of a voice coil motor (VCM) 12 configured to rotate an actuator arm 14 about a pivot, a first secondary actuator 16 configured to actuate a suspension 18 relative to the actuator arm 14, and a second secondary actuator 20 configured to actuate a distal end of the suspension 18 near the head slider. This configuration is referred to as a triple stage actuator with the second and third stage having more error rejection capability at lower frequency range (higher slope in the sensitivity function) as the actuators get closer to the head element (due to moving a smaller mass). Although the triple stage actuator improves the servo performance by improving the sensitivity function of the servo loop, each additional secondary actuator increases the cost and manufacturing complexity of the disk drive.

BRIEF DESCRIPTION OF THE DRAWINGS

FIG. 4A shows a servo control system according to an embodiment comprising a triple stage servo loop controlling a dual stage actuator.

FIGS. 4B and 4C show a sensitivity function of the triple stage servo loop controlling the dual stage actuator according to an embodiment.

DETAILED DESCRIPTION

Figure 2A:
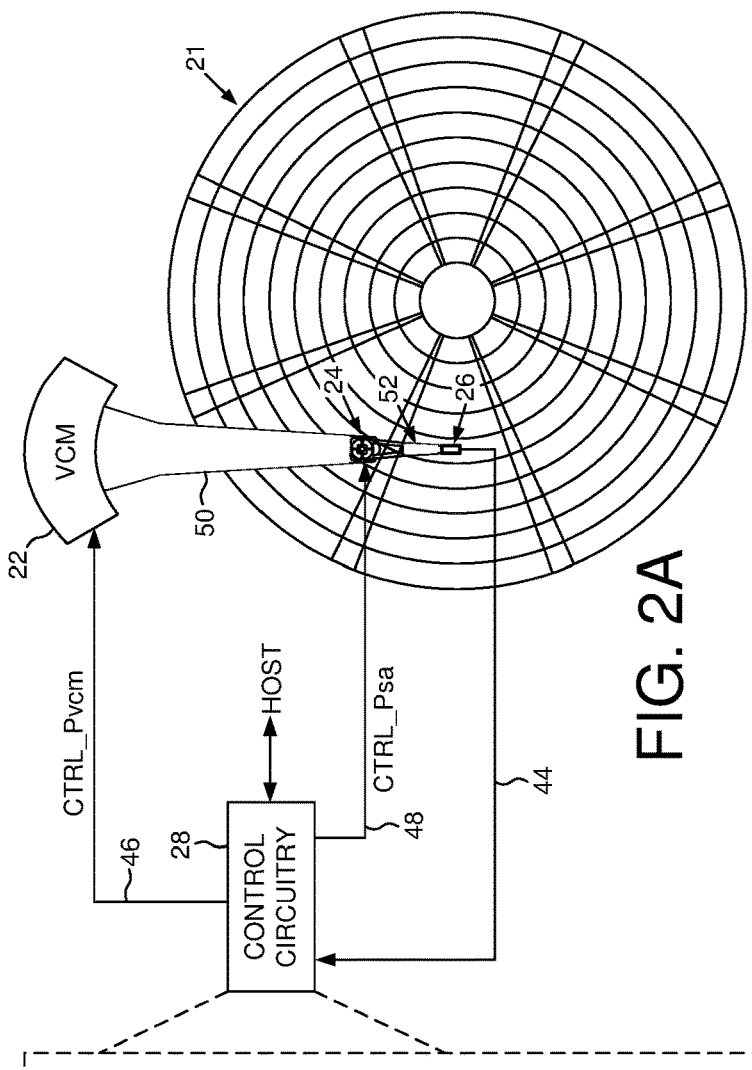
FIG. 2A shows a data storage device in the form of a disk drive according to an embodiment comprising a head actuated over a disk using a dual stage actuator comprising a primary actuator and a secondary actuator.
Figure 2B:
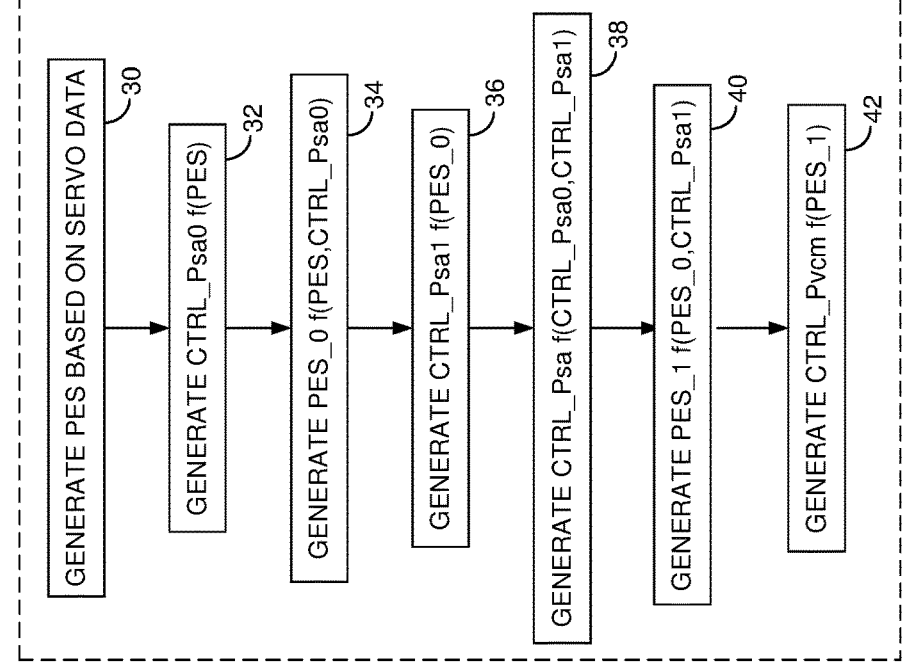
FIG. 2B is a flow diagram according to an embodiment wherein a triple stage servo loop is used to control the dual stage actuator.

FIG. 2A shows a data storage device in the form of a disk drive according to an embodiment comprising a disk 21 having servo data (e.g., servo sectors), a primary actuator in the form of a voice coil motor (VCM) 22 and a secondary actuator 24 forming a dual stage actuator configured to actuate a head 26 over the disk 21. The disk drive further comprises control circuitry 28 configured to control the dual stage actuator using a triple stage servo loop by executing the flow diagram of FIG. 2B. A position error signal (PES) is generated based on the servo data (block 30), and a first control signal is generated based on the PES (block 32). The PES is adjusted based on the first control signal to generate a first adjusted PES (block 34), and a second control signal is generated based on the first adjusted PES (block 36). A secondary actuator control signal is generated based on the first control signal and the second control signal, wherein the secondary actuator control signal is applied to the secondary actuator (block 38). The first adjusted PES is adjusted based on the second control signal to generate a second adjusted PES (block 40). A VCM control signal is generated based on the second adjusted PES, wherein the VCM control signal is applied to the VCM (block 42).

In the embodiment of FIG. 2A, the control circuitry 28 processes a read signal 44 emanating from the head 26 representing the servo data (e.g., servo sectors), and demodulates the read signal 44 into the PES. The control circuitry 28 processes the PES using a triple stage servo loop in order to generate a first analog control signal 46 applied to the VCM 22, and a second analog control signal 48 applied to the secondary actuator 24. In the embodiment of FIG. 2A, the VCM 22 rotates an actuator arm 50 about a pivot, and the secondary actuator 24 actuates a suspension 52 about the actuator arm 50. However, the secondary actuator 24 may be located at any suitable location, such as near the distal end of the suspension 52 near a slider on which the head is fabricated, or on the slider itself. In addition, the secondary actuator 24 may comprise any suitable actuating element(s), such as a piezoelectric (PZT) element that actuates mechanically, a thermal element that actuates through thermal expansion/contraction, etc.

Figure 1:
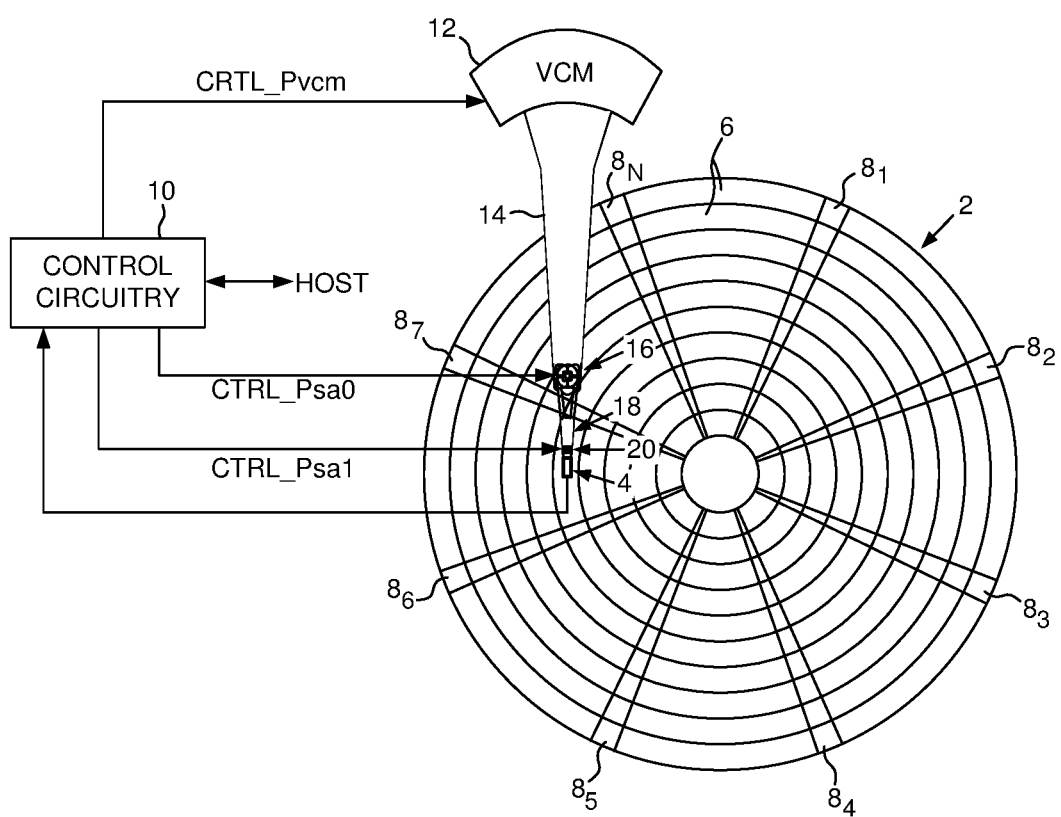
FIG. 1 shows a prior art disk drive comprising a head actuated over a disk using a triple stage actuator.
Figure 3A:
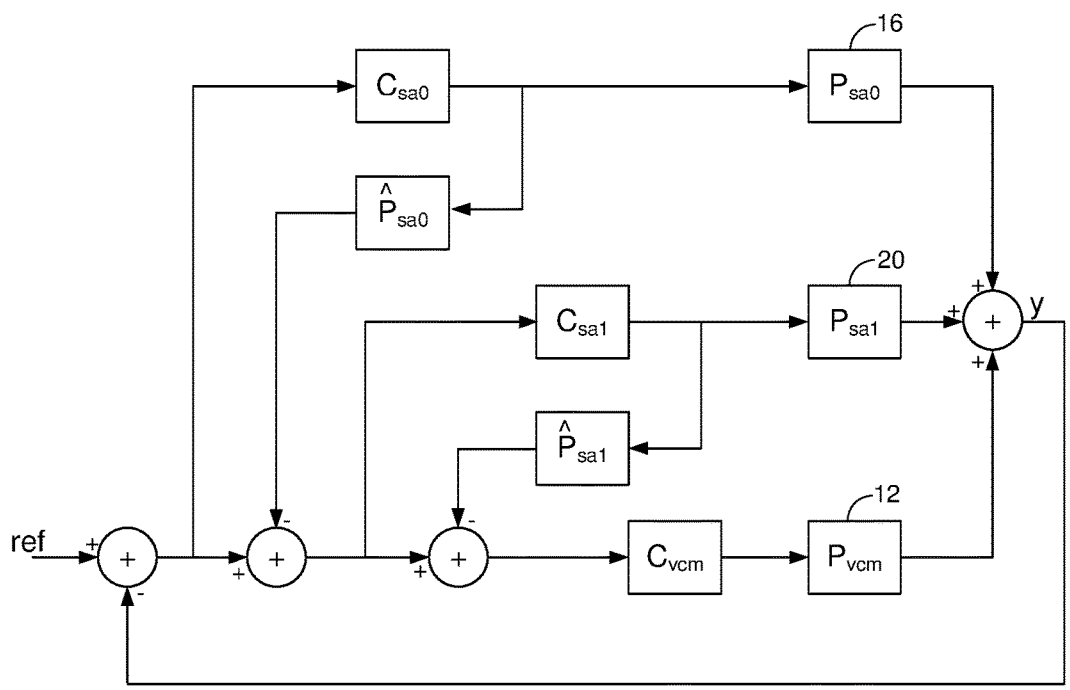
FIG. 3A shows a prior art servo control system comprising a triple stage servo loop controlling a triple stage actuator.
Figure 3B:
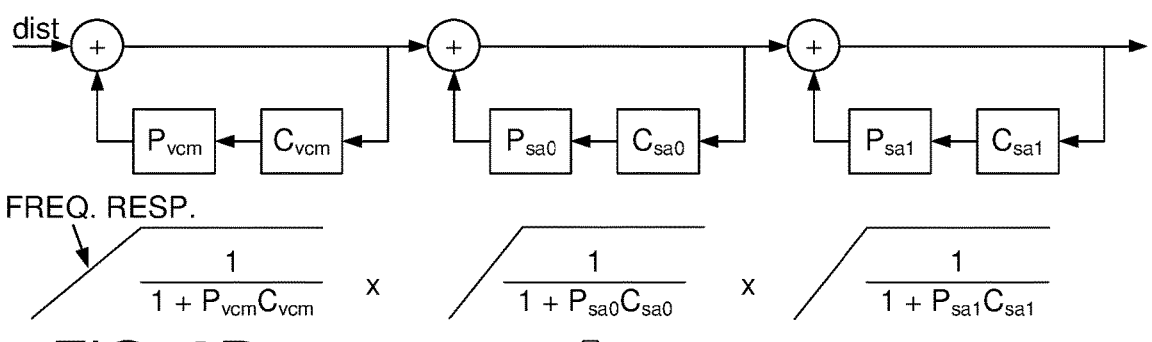
FIGS. 3B and 3C show a sensitivity function of a prior art triple stage servo loop controlling the triple stage actuator.
Figure 3C:

FIG. 3A shows a prior art servo control system comprising a triple stage servo loop controlling a triple stage actuator such as shown in FIG. 1. FIG. 3B shows the contribution of each stage to the resulting sensitivity function, with FIG. 3C showing the overall sensitivity function of the triple stage servo loop. The third stage actuator and servo loop provides additional low frequency attenuation which helps reject disturbances (such as vibrations affecting the disk drive) as compared to a conventional dual stage actuator and dual stage servo loop. However, the second secondary actuator 20 increases the cost and manufacturing complexity of the disk drive. Accordingly, in one embodiment a triple stage servo loop is used to control a dual stage actuator in order to improve the sensitivity function of the servo control system while avoiding the cost and manufacturing complexity of two secondary actuators.

An example of this embodiment is illustrated by the servo control system shown in FIG. 4A. The actuating effect of the VCM 22 and the secondary actuator 24 are combined to generate a head position 54 which is subtracted from a reference position 56 to generate a position error signal (PES) 58. A first control signal 60 is generated based on the PES 58 by processing the PES 58 with a suitable secondary actuator compensator 62. The first control signal 60 is processed with a model 64 of the secondary actuator 24 to generate an estimated effect of the secondary actuator 24, wherein the estimated effect is subtracted from the PES 58 to generate a first adjusted PES 66. A second control signal 68 is generated based on the first adjusted PES 66 by processing the first adjusted PES 66 with another suitable secondary actuator compensator 70. A secondary actuator control signal 72 is generated based on the first control signal 60 and the second control signal 68, wherein the secondary actuator control signal 72 is applied to the secondary actuator 24. The second control signal 68 is processed with the model 64 of the secondary actuator 24 to generate an estimated effect of the secondary actuator 24, wherein the estimated effect is subtracted from the first adjusted PES 66 to generate a second adjusted PES 76. A VCM control signal 78 is generated based on the second adjusted PES 76 by processing the second adjusted PES 76 with a suitable VCM compensator 80, wherein the VCM control signal 78 is applied to the VCM 22.

FIG. 4B shows the contribution of each stage of the triple stage servo loop shown in FIG. 4A to the resulting sensitivity function, with FIG. 4C showing the overall sensitivity function. Similar to the prior art sensitivity function of FIG. 3C, the sensitivity function of FIG. 4C improves the performance of the servo control system by providing additional low frequency attenuation which helps reject disturbances (such as vibrations affecting the disk drive) as compared to a conventional dual stage actuator and dual stage servo loop. However, the triple stage servo loop of FIG. 4A and corresponding sensitivity function of FIG. 4C controls a single secondary actuator 24 which reduces the cost and manufacturing complexity of the disk drive.

Although in the embodiments described above the servo control system controls a head actuated over a disk in a data storage device, in other embodiments a triple stage servo loop may be used to control any suitable servo system that employs a primary actuator and a secondary actuator. For example, the above described concepts may be employed in servo control systems used in industrial applications (e.g., robotics, automotive, aeronautics, medical, manufacturing, etc.) or consumer applications (e.g., appliances, toys, cameras, etc.).

Any suitable control circuitry may be employed to implement the flow diagrams in the above embodiments, such as any suitable integrated circuit or circuits. For example, the control circuitry may be implemented in a power integrated circuit, or in a component separate from the power integrated circuit, such as a disk controller, or certain operations described above may be performed by a power integrated circuit and others by a disk controller. In one embodiment, the power integrated circuit and disk controller are implemented as separate integrated circuits, and in an alternative embodiment they are fabricated into a single integrated circuit or system on a chip (SOC). In addition, the control circuitry may include a suitable preamp circuit and a read channel circuit implemented as separate integrated circuits, integrated into the or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising servo data;
   a head;
   a voice coil motor (VCM) and a secondary actuator configured to actuate the head over the disk; and
   control circuitry configured to:
      generate a position error signal (PES) based on the servo data;
      generate a first control signal based on the PES;
      adjust the PES based on the first control signal to generate a first adjusted PES;
      generate a second control signal based on the first adjusted PES;
      generate a secondary actuator control signal based on the first control signal and the second control signal;
      apply the secondary actuator control signal to the secondary actuator;
      adjust the first adjusted PES based on the second control signal to generate a second adjusted PES;
      generate a VCM control signal based on the second adjusted PES; and
      apply the VCM control signal to the VCM.

2. The data storage device as recited in claim 1, wherein the control circuitry is further configured to:
   apply the first control signal to a model of the secondary actuator to generate a first estimated position of the head; and
   adjust the PES by subtracting the first estimated position of the head from the PES to generate the first adjusted PES.

3. The data storage device as recited in claim 2, wherein the control circuitry is further configured to:

apply the second control signal to the model of the secondary actuator to generate a second estimated position of the head; and adjust the first adjusted PES by subtracting the second estimated position of the head from the first adjusted PES to generate the second adjusted PES.

4. The data storage device as recited in claim 1, wherein the control circuitry is further configured to add the first control signal and the second control signal to generate the secondary actuator control signal.

5. The data storage device as recited in claim 1, wherein the control circuitry actuates the head over the disk based on a sensitivity function:

$$\frac{1}{1+P_{vcm}C_{vcm}} \times \frac{1}{1+P_{sa}C_{sa0}} \times \frac{1}{1+P_{sa}C_{sa1}}$$

where:

$P_{vcm}$ represents the VCM;
$C_{vcm}$ represents a VCM compensator;
$P_{sa}$ represents the secondary actuator;
$C_{sa0}$ represents a first secondary actuator compensator; and
$C_{sa1}$ represents a second secondary actuator compensator.

6. A method of operating a data storage device, the method comprising actuating a head over a disk based on a sensitivity function:

$$\frac{1}{1+P_{vcm}C_{vcm}} \times \frac{1}{1+P_{sa}C_{sa0}} \times \frac{1}{1+P_{sa}C_{sa1}}$$

where:

$P_{vcm}$ represents a voice coil motor (VCM) configured to actuate the head over the disk;
$C_{vcm}$ represents a VCM compensator;
$P_{sa}$ represents a secondary actuator configured to actuate the head over the disk;
$C_{sa0}$ represents a first secondary actuator compensator; and
$C_{sa1}$ represents a second secondary actuator compensator.

7. Control circuitry comprising a servo control system having a sensitivity function:

$$\frac{1}{1+P_{pa}C_{pa}} \times \frac{1}{1+P_{sa}C_{sa0}} \times \frac{1}{1+P_{sa}C_{sa1}}$$

where:

$P_{pa}$ represents a primary actuator;
$C_{pa}$ represents a primary actuator compensator;
$P_{sa}$ represents a secondary actuator;
$C_{sa0}$ represents a first secondary actuator compensator; and
$C_{sa1}$ represents a second secondary actuator compensator.

8. The control circuitry as recited in claim 7, wherein primary actuator comprises a voice coil motor (VCM).

9. The control circuitry as recited in claim 8, wherein secondary actuator comprises a piezoelectric element.

10. A device comprising the control circuitry as recited in claim 7.

11. A device comprising the primary actuator, the primary actuator compensator, the secondary actuator, the first secondary actuator compensator, the second secondary actuator compensator and the control circuitry as recited in claim 7.

* * * * *